(12) United States Patent
Washiro et al.

(10) Patent No.: US 9,219,374 B2
(45) Date of Patent: Dec. 22, 2015

(54) BATTERY CONTROL UNIT, CHARGE-DISCHARGE UNIT, ELECTRIC POWER CONTROL UNIT, BATTERY UNIT, ELECTRIC VEHICLE

(71) Applicant: Sony Corporation, Tokyo (JP)

(72) Inventors: Takanori Washiro, Kanagawa (JP); Taro Tadano, Chiba (JP); Kazuyoshi Takemura, Tokyo (JP); Kuniya Hayashi, Tokyo (JP); Kayoko Tanaka, Tokyo (JP); Yoichiro Sako, Tokyo (JP); Kazutoshi Serita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 186 days.

(21) Appl. No.: 13/945,549

(22) Filed: Jul. 18, 2013

(65) Prior Publication Data

US 2014/0028265 A1 Jan. 30, 2014

(30) Foreign Application Priority Data

Jul. 27, 2012 (JP) .................................. 2012-167091

(51) Int. Cl.
*H02J 7/00* (2006.01)

(52) U.S. Cl.
CPC . *H02J 7/007* (2013.01); *H02J 7/00* (2013.01); *Y02T 10/7005* (2013.01)

(58) Field of Classification Search
CPC .......................... B06L 11/1851; B06L 11/1853
USPC ....................................... 320/127–136; 702/63
See application file for complete search history.

(56) References Cited

U.S. PATENT DOCUMENTS

| 2007/0108946 A1* | 5/2007 | Yamauchi et al. ............. 320/132 |
| 2009/0284225 A1* | 11/2009 | Nakanuma et al. ............ 320/134 |
| 2009/0302681 A1* | 12/2009 | Yamada et al. .................. 307/46 |
| 2013/0082641 A1* | 4/2013 | Nishibayashi et al. ........ 320/106 |

FOREIGN PATENT DOCUMENTS

JP 2012-029483 2/2012

* cited by examiner

*Primary Examiner* — Paul Dinh
(74) *Attorney, Agent, or Firm* — Hazuki International, LLC

(57) ABSTRACT

A battery control unit includes: a storage section holding remaining amount data that indicates a remaining amount of a battery; and a control section managing the battery in a fashion of separating the battery into a first region and a second region, by a way of separating the remaining amount data into first remaining amount data and second remaining data and of allowing the storage section to hold the first and second remaining amount data.

18 Claims, 12 Drawing Sheets

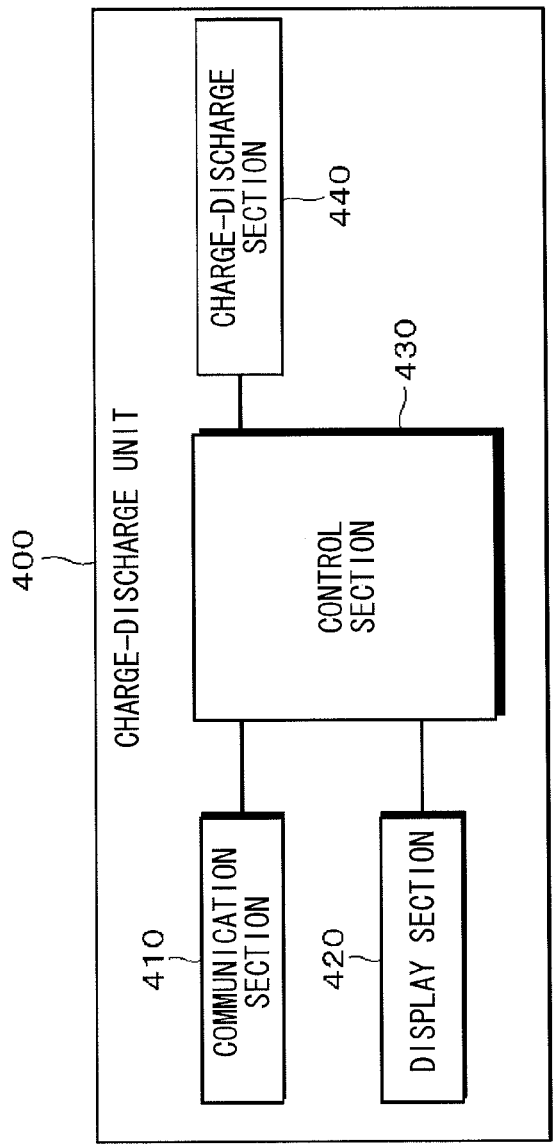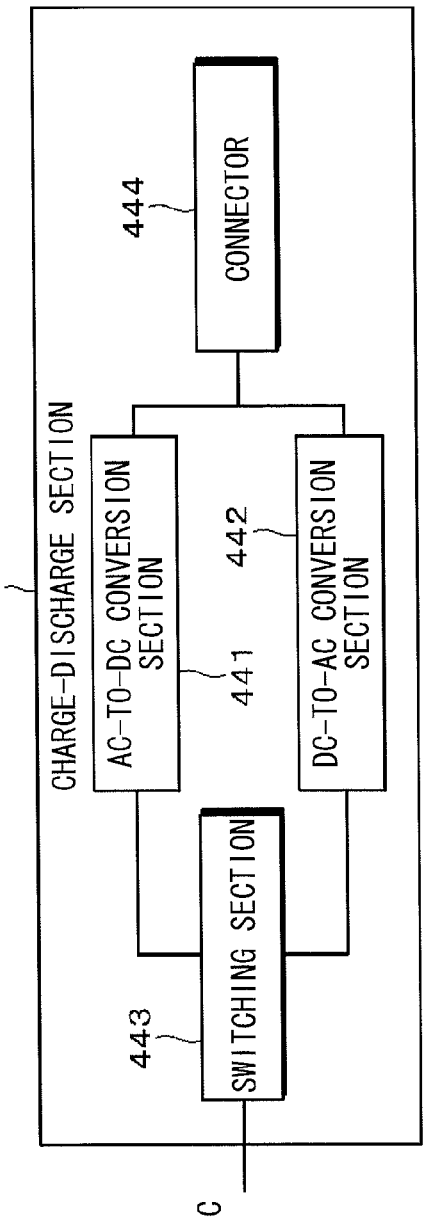
FIG. 3A
FIG. 3B

BATTERY CONTROL UNIT, CHARGE-DISCHARGE UNIT, ELECTRIC POWER CONTROL UNIT, BATTERY UNIT, ELECTRIC VEHICLE

CROSS REFERENCES TO RELATED APPLICATIONS

The present application claims priority to Japanese Priority Patent Application JP 2012-167091 filed in the Japan Patent Office on Jul. 27, 2012, the entire content of which is hereby incorporated by reference.

BACKGROUND

The present disclosure relates to a battery control unit, a charge-discharge unit, an electric power control unit, a battery unit, and an electric vehicle.

In recent years, various proposals to efficiently use electric power and improve convenience of electric power use have been made with an increased interest in energy issues and the like. As one of the proposals, there is proposed an electric power system interchanging electric power from a battery of an electric vehicle with electric apparatuses of a consumer while securing sufficient remaining amount of the battery of the electric vehicle (refer to Japanese Unexamined Patent Application Publication No. 2012-29483).

SUMMARY

Since batteries of electric vehicles have large capacity, the batteries are expected to contribute to stabilization of electric power supply-demand balance. However, the electric power system disclosed in Japanese Unexamined Patent Application Publication No. 2012-29483 lacks a technique of separately processing personal electric power and public electric power; therefore, the use of the battery of the electric vehicle is limited to personal use, that is, the battery of the electric vehicle is used as a home power source through reversing an electric power flow from the battery of the electric vehicle to a home electric power grid.

It is desirable to provide a battery control unit, a charge-discharge unit, an electric power control unit, a battery unit, and an electric vehicle which are capable of effectively using electric power stored in a battery without being limited to personal use.

According to an embodiment of the present disclosure, there is provided a battery control unit including: a storage section holding remaining amount data that indicates a remaining amount of a battery; and a control section managing the battery in a fashion of separating the battery into a first region and a second region, by a way of separating the remaining amount data into first remaining amount data and second remaining data and of allowing the storage section to hold the first and second remaining amount data.

According to an embodiment of the present disclosure, there is provided a charge-discharge unit including a control section operable to: supply electric power from an electric power grid to a battery when electric power supply is sufficient for electric power demand in the electric power grid; and supply electric power reversed from the battery to the electric power grid when the electric power supply is insufficient for the electric power demand in the electric power grid.

According to an embodiment of the present disclosure, there is provided an electric power control unit including a control section operable to: perform monitoring as to whether or not electric power supply is sufficient for electric power demand in an electric power grid; and selectively provide a charge-discharge unit with a first instruction or a second instruction, depending on a result of the monitoring, the first instruction instructing the charge-discharge unit to supply electric power from the electric power grid to the battery when the electric power supply is sufficient for the electric power demand in the electric power grid, the second instruction instructing the charge-discharge unit to supply electric power reversed from the battery to the electric power grid when the electric power supply is insufficient for the electric power demand in the electric power grid.

According to an embodiment of the present disclosure, there is provided a battery unit including: a first battery available to a predetermined user only; and a second battery available to the user, and configured to supply electric power to an electric power grid.

According to an embodiment of the present disclosure, there is provided an electric vehicle provided with a battery control unit, the battery control unit including: a battery; a storage section holding remaining amount data that indicates a remaining amount of the battery; and a control section managing the battery in a fashion of separating the battery into a first region and a second region, by a way of separating the remaining amount data into first remaining amount data and second remaining data and of allowing the storage section to hold the first and second remaining amount data.

According to an embodiment of the present disclosure, there is provided an electric vehicle including: a first battery available to a predetermined user only; and a second battery available to the user, and configured to supply electric power to an electric power grid.

In the above-described embodiments of the present disclosure, electric power stored in the battery is allowed to be effectively used without being limited to personal use.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the application, and are incorporated in and constitute a part of this specification. The drawings illustrate embodiments and, together with the specification, serve to explain the principles of the application.

FIGS. 3A and 3B are block diagrams illustrating a configuration of a charge-discharge unit and a configuration of a charge-discharge section, respectively.

DETAILED DESCRIPTION

Figure 1:
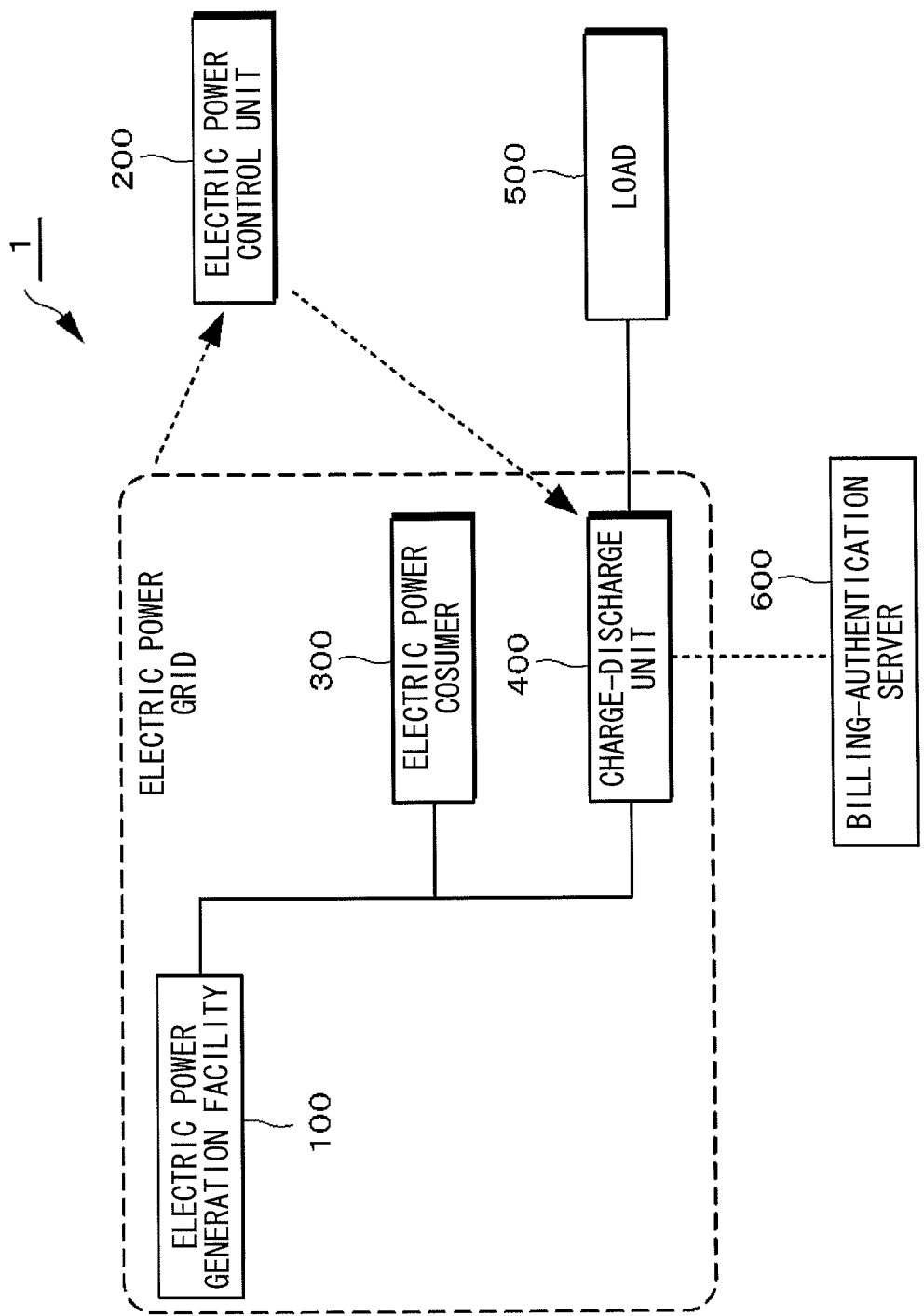
FIG. 1 is a block diagram illustrating a configuration of an electric power system according to an embodiment of the present disclosure.

Some embodiments of the present disclosure will be described in detail below referring to the accompanying drawings. The present disclosure is not limited to embodiments described herein. It is to be noted that description will be given in the following order.
1. First Embodiment
1-1. Configuration of electric power system
1-2. Process in electric power system
2. Second Embodiment
2-1. Configuration of electric power system
2-2. Process in electric power system
3. Modifications 1. First Embodiment 1-1. Configuration of Electric Power System FIG. 1 is a block diagram illustrating a configuration of an electric power system according to an embodiment of the present disclosure. The electric power system 1 is configured of an electric power generation facility 100, an electric power control unit 200, an electric power consumer 300, a charge-discharge unit 400, a load 500, and a billing-authentication server 600.

The electric power generation facility 100 generates electric power in, for example, an electric power plant of an electric power company. As an electric power generation method, any of methods such as nuclear electric power generation, thermal electric power generation, and electric power generation by natural energy may be adopted. However, an electric power generation facility using energy with low environmental load referred to as so-called natural energy and renewable energy may be preferable in consideration of energy issues, environmental issues, and the like in recent years. Examples of such an electric power generation facility include electric power generation facilities using energy such as sunlight, solar heat, wind power, hydraulic power, micro-hydro power, tidal power, wave power, water temperature difference, ocean current, biomass, geothermal heat, sound, and vibration. Moreover, electric power generation facilities generating electric power by man power such as a stationary bike provided with an electric power generation function, and a floor with a mechanism to generate electric power when people walk across the floor may be adopted.

Figure 2:
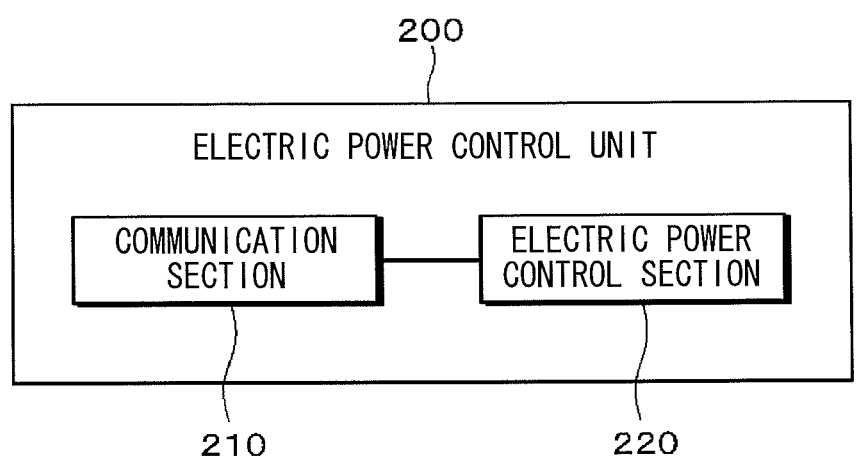
FIG. 2 is a block diagram illustrating a configuration of an electric power control unit.

The electric power control unit 200 is a server unit performing control of an electric power supply and demand situation in an electric power grid, or the like. FIG. 2 is a block diagram illustrating a configuration of the electric power control unit 200. The electric power control unit 200 includes a communication section 210 and an electric power control section 220.

The communication section 210 is, for example, a network interface for performing communication with the electric power generation facility 100, the charge-discharge unit 400, and the like through a network such as the Internet or a dedicated line based on a predetermined protocol. Any of communication systems including cable communication and communications using wireless LAN (Local Area Network), Wi-Fi (Wireless Fidelity), 3G networks, and 4G networks may be adopted.

The electric power control section 220 controls switching of operations of the charge-discharge unit 400 to allow the charge-discharge unit 400 to charge or discharge the load 500. The electric power control section 220 constantly monitors an electric power demand in the electric power grid through keeping track of an electric power generation amount in the electric power generation facility 100 and an electric power consumption amount by an electric power consumer. Then, switching of the operations of the charge-discharge unit 400 is controlled based on electric power supply-demand balance in the electric power grid.

More specifically, when electric power supply is sufficient for electric power demand in the electric power grid, the electric power control section 220 controls the operation of the charge-discharge unit 400 so as to allow the charge-discharge unit 400 to supply electric power to the load 500. On the other hand, when electric power supply is not sufficient for electric power demand in the electric power grid, the electric power control section 220 controls the operation of the charge-discharge unit 400 so as to allow the charge-discharge unit 400 to discharge electric power from the load 500 to the electric power grid. A control signal for controlling the charge-discharge unit 400 by the electric power control section 220 is transmitted to the charge-discharge unit 400 through the communication section 210.

Referring back to FIG. 1, the charge-discharge unit 400 supplies electric power to the load 500 including a battery.

A configuration of the charge-discharge unit 400 will be described below referring to FIGS. 3A and 3B. The charge-discharge unit 400 includes a communication section 410, a display section 420, a control section 430, and a charge-discharge section 440.

The communication section 410 is, for example, a network interface for performing communication with the electric power control unit 200 through a network such as the Internet or a dedicated line based on a predetermined protocol. Any of communication systems including cable communication and communications using wireless LAN, Wi-Fi, 3G networks, and 4G networks may be adopted.

The display section 420 is, for example, a display section configured of an LCD (Liquid Crystal Display), a PDP (Plasma Display Panel), an organic EL (Electro Luminescence) panel, or the like. A charge amount to the load 500, a discharge amount from the load 500, and the like are displayed on the display section 420 under control of the control section 430.

The control section 430 is configured of, for example, a CPU, a RAM, a ROM, and the like, and is a processing section executing a predetermined program to perform entire control of the charge-discharge unit 400, or the like. The control section 430 controls operation of the charge-discharge section 440 based on a control signal from the electric power control unit 200 for instructing the charge-discharge section 440 to charge or discharge electric power.

FIG. 3B is a block diagram illustrating a configuration of the charge-discharge section 440. The charge-discharge section 440 includes an AC-to-DC conversion section 441, a DC-to-AC conversion section 442, a switching section 443, and a connector 444. The charge-discharge section 440 charges the load 500 and discharges the load 500.

The AC-to-DC conversion section 441 converts AC electric power to DC electric power, and adjusts a voltage. The DC-to-AC conversion section 442 converts DC electric power to AC electric power, and adjusts a voltage. The connector 444 is capable of being inserted into a charge-discharge adapter of the load 500. The switching section 443 is, for example, a switchable switch circuit. The switching section 443 operates based on control by the control section 430 according to a control signal from the charge-discharge unit 400, and performs switching to charge the load 500 or to discharge the load 500.

When electric power from the electric power generation facility 100 is supplied to the load 500, the switching section 443 is switched to be connected to the AC-to-DC conversion section 441. Then, the electric power is converted into DC electric power by the AC-to-DC conversion section 441, and the DC electric power is supplied to a battery 510 of the load 500 through the connector 444 to charge the battery 510.

On the other hand, when electric power from the battery 510 of the load 500 is discharged to the electric power grid, the switching section 443 is switched to be connected to the DC-to-AC conversion section 442. Then, the electric power is converted into AC electric power by the DC-to-AC conversion section 442, and the AC electric power is supplied to the electric power grid by the charge-discharge unit 400.

The connector 444 of the charge-discharge unit 400 is a connector such as an outlet or a plug for connection with the load 500 or the battery 510 disposed in the load 500. The connector 444 has a function as an authentication outlet. The authentication outlet adopts a contactless IC card system, a RFID (radio-frequency identification) over power line system, or the like.

The contactless IC card system is a system using a mechanism to read information in a contactless IC card. The connector 444 is provided with a reader-writer for IC reading-writing, and an IC chip to which identification information and the like are written is embedded in a plug of the load 500 or the battery 510. Thus, when the plug of the load 500 is inserted into the connector 444 of the charge-discharge unit 400, the IC chip and the reader-writer are brought close to each other to allow communication between them, and the reader-writer is allowed to read various kinds of information including identification information accordingly.

The RFID over power line system is a system of reading various kinds of information written to an IC chip included in a battery or an apparatus or a device including a battery by a radio-frequency signal of the reader-writer superimposed on an electric power line for electric power supply.

In embodiments of the present disclosure, any of the above-described systems may be adopted. Moreover, in addition to these two systems, any system capable of reading information during connection with an outlet for charge may be adopted.

Referring back to FIG. 1, the load 500 of the electric power system 1 includes the battery 510, and is an electrical apparatus, an electric home appliance, an electric vehicle, or the like which operates by electric power.

Figure 4:
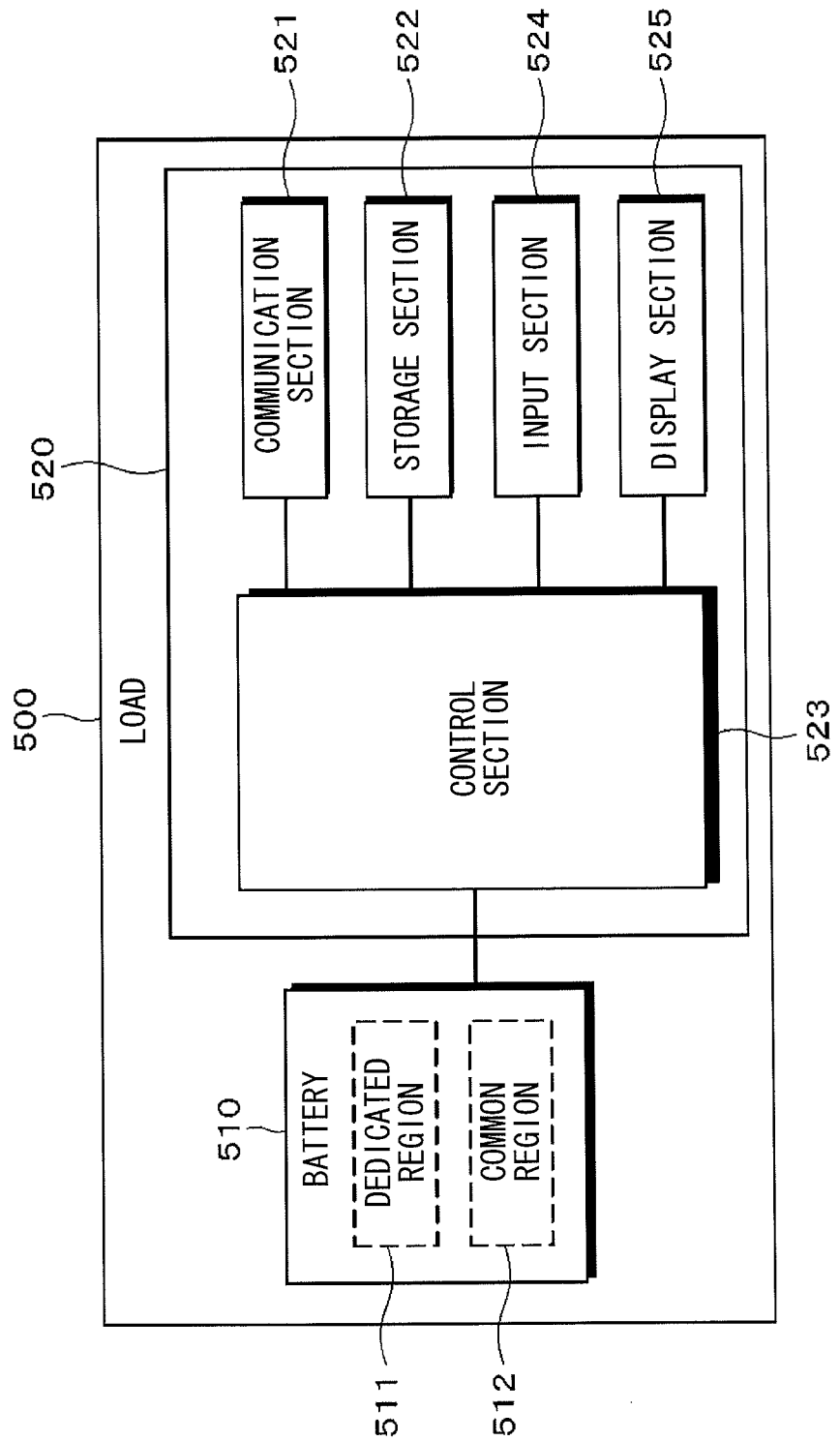
FIG. 4 is a block diagram illustrating a configuration of a load according to a first embodiment of the present disclosure.
Figure 5:
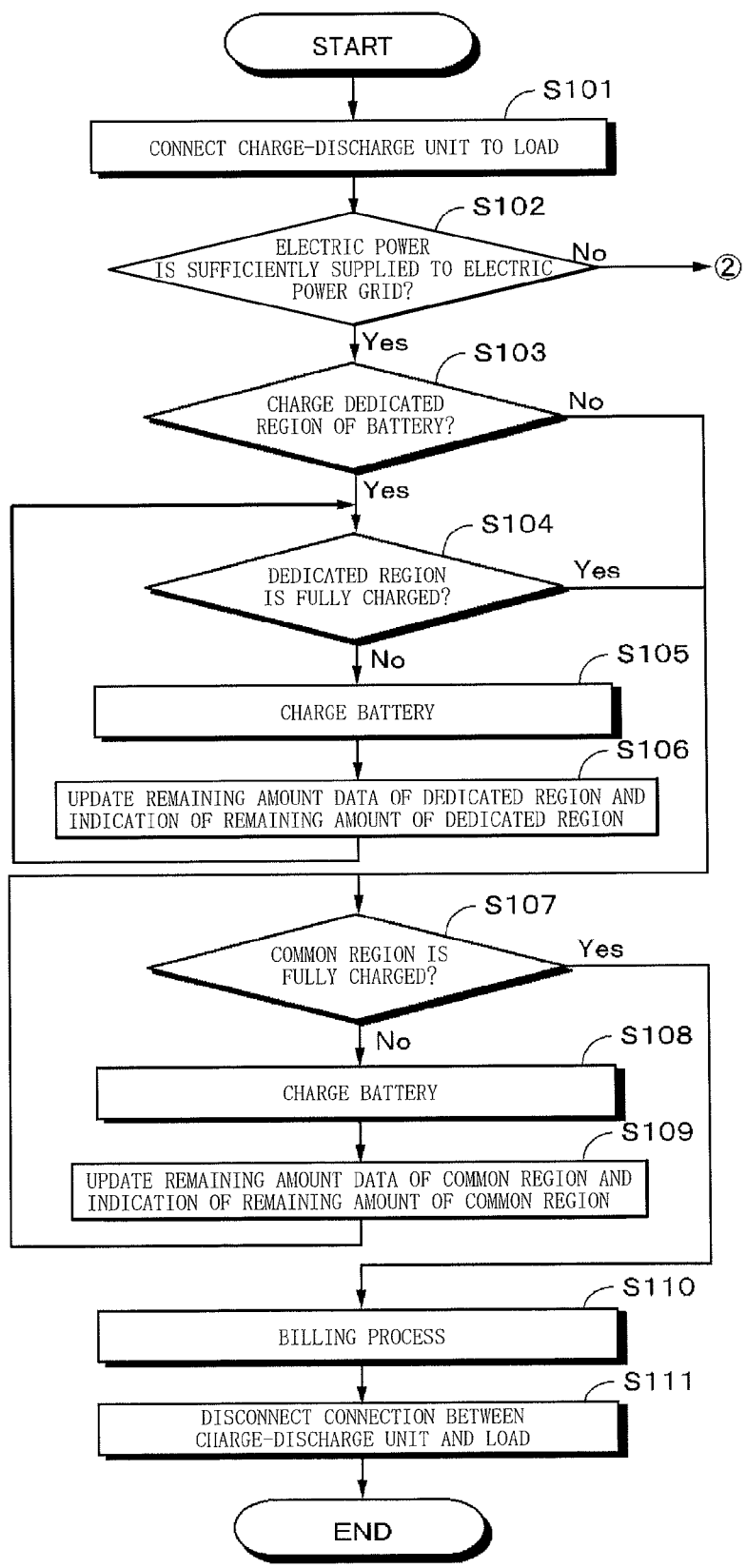
FIG. 5 is a flowchart illustrating a process flow when the charge-discharge unit and the load are connected to each other in the first embodiment of the present disclosure.

A specific configuration of the load 500 will be described below referring to FIG. 4. The load 500 includes the battery 510 and a battery control unit 520. The battery control unit 520 includes a communication section 521, a storage section 522, a control section 523, an input section 524, and a display section 525.

As the battery 510, any of chargeable-dischargeable batteries such as a lithium-ion secondary battery, a lithium-ion polymer secondary battery, and a nickel-hydrogen battery may be adopted. The battery 510 includes a dedicated region 511 and a common region 512. The dedicated region 511 and the common region 512 will be described later.

The communication section 521 is, for example, a network interface for performing communication through a network such as the Internet or a dedicated line based on a predetermined protocol. Any of communication systems including cable communication and communications using wireless LAN, Wi-Fi, 3G networks, and 4G networks may be adopted.

The storage section 522 is, for example, a storage medium configured of a hard disk, a flash memory, or the like. The storage section 522 holds remaining amount data which indicates remaining amounts of the dedicated region 511 and the common region 512 of the battery 510.

The control section 523 is configured of, for example, a CPU, a RAM, a ROM, and the like, and is a processing section executing a predetermined program to control the load 500. The control section 523 obtains the remaining amount of the battery 510 to confirm whether the battery 510 is fully charged, whether the remaining amount of the battery 510 is zero, or the like. The remaining amount of the battery 510 is obtainable, for example, through referring to a measurement value by a voltmeter or an ammeter included in the battery 510.

Moreover, when the battery 510 of the load 500 is charged or discharged, the control section 523 updates remaining amount data of the dedicated region 511 and the common region 512 of the battery 510 stored in the storage section 522 accordingly. In other words, when electric power is supplied to the battery 510 and when the battery 510 is discharged, the control section 523 determines how much electric power is supplied to or discharged from these regions, and the control section 523 writes and updates, based on the result, the remaining amount data of the dedicated region 511 and the common region 512 in the storage section 522.

The input section 524 is an input section used by a user to input an instruction to the load 500. The input section 524 is configured of a touch screen, a button, a switch, a dial, and the like which are integrally formed with the display section 525. When an input is supplied to the input section 524, a control signal corresponding to the input is generated, and is output to the control section 523. Then, the control section 523 performs a computation or control corresponding to the control signal.

In the embodiment, for example, it is preferable that the user be allowed to select the dedicated region 511 or the common region 512 of the battery 510 to be charged with use of the input section 524. In the case where the user selects the dedicated region 511 of the battery 510 to be charged, and the charge-discharge unit 400 charges the battery 510, the control section 523 increases the remaining amount of the dedicated region 511 in the remaining amount data in the storage section 522. Moreover, in the case where the dedicated region 511 of the battery 510 is discharged, the control section 523 decreases the remaining amount of the dedicated region 511 in the remaining amount data in the storage section 522.

On the other hand, in the case where the user selects the common region 512 of the battery 510 to be charged, and the charge-discharge unit 400 charges the battery 510, the control section 523 increases the remaining amount of the common region 512 in the remaining amount data in the storage section 522. Moreover, in the case where the common region 512 of the battery 510 is discharged, the control section 523 decreases the remaining amount of the common region 512 in the remaining amount data in the storage section 522. Thus, even if the battery 510 in itself is not separated into the dedicated region 511 and the common region 512, the battery 510 may be virtually separated into the dedicated region 511 and the common region 512.

Thus, in the first embodiment, the dedicated region 511 and the common region 512 of the battery 510 are not physically individual batteries, and configure one battery 510. When the remaining amounts of the dedicated region 511 and the common region 512 of the battery 510 are separately controlled in data, the battery 510 may be treated as a battery virtually having two regions, i.e., the dedicated region 511 and the common region 512.

Electric power stored in the dedicated region 511 of the battery 510 is available to a predetermined user only, and is supplied to the predetermined user at a higher price than the price of electric power of the common region 512. The predetermined user may be an owner of a load, a person authorized by the owner of the load to use the load, a person having the right to use the load, or the like.

On the other hand, the electric power stored in the common region 512 of the battery 510 may be also available to the predetermined user. However, the common region 512 is supposed to be discharged under a state in which an electric power supply and demand situation in an electric power grid in a predetermined range such as a town or a region is tight so as to supply electric power to the electric power grid. The electric power of the common region 512 is supplied, for example, for free or at a lower price than the price of the electric power of the dedicated region 511.

It is to be noted that the when the user uses electric power stored in the battery 510, it is necessary to use the electric power of the dedicated region 511 first, and then to use the electric power of the common region 512 when the dedicated region 511 runs out of electric power, because in the case where there is a difference in electric power rate between the dedicated region 511 and the common region 512, if the electric power of the common region 512 is allowed to be used first, it becomes possible to continuously use only the electric power of the common region 512 which is lower in price. For example, this is achievable through not decreasing the remaining amount of the common region 512 until the remaining amount of the dedicated region 511 becomes empty in updating of the remaining amount data stored in the storage section 522.

Since the battery 510 is virtually separated into the dedicated region 511 and the common region 512 in the remaining amount data in the above-described manner, a ratio in capacity between the dedicated region 511 and the common region 512 in the battery 510 are not necessarily equal to each other. The dedicated region 511 may be larger in capacity than the common region 512, or the common region 512 may be larger in capacity than the dedicated region 511.

Moreover, the ratio in capacity between the dedicated region 511 and the common region 512 in the battery 510 may be variable after the user starts to use the battery 510. However, if the ratio is variable in a state in which electric power is stored in the battery 510, electric power charged to the common region 512 at low cost is replaceable with electric power of the dedicated region 511. Therefore, in the case where the ratio in capacity between the dedicated region 511 and the common region 512 in the battery 510 is variable, for example, it is preferable that the ratio be variable only when the remaining amounts of the dedicated region 511 and the common region 512 are both zero. For example, when the user inputs a specific value indicating the ratio in capacity between the dedicated region 511 and the common region 512 to the input section 524, and the control section 523 defines the remaining amount data in the storage section 522 based on the value, the ratio in capacity between the dedicated region 511 and the common region 512 is varied.

The display section 525 is, for example, a display section configured of an LCD, a PDP, an organic EL panel, or the like. The remaining amounts of the dedicated region 511 and the common region 512 of the battery 510, and the like are displayed on the display section 525.

The load 500 or the battery 510 included in the load 500 may have a unique ID (identification) as identification information for self-identification. When the charge-discharge unit 400 obtains the ID with use of the authentication outlet, the charge-discharge unit 400 is allowed to specify its user, the kind of a load, and the like, and then to execute a charging method, a billing process, and the like specific to the user.

Back to the description of the electric power system 1 illustrated in FIG. 1, the billing-authentication server 600 is a server unit which performs confirmation and authentication of the load 500, and performs a billing process to the user for electric power supply. The billing-authentication server 600 may be owned and operated by an electric power provider possessing the electric power generation facility 100 and the like, or a third party affiliated with the electric power provider.

The electric power system 1 is configured as follows.

1-2. Process in Electric Power System

Next, a process performed in the above-described electric power system 1 will be described below. In the first embodiment, the dedicated region 511 and the common region 512 of the battery 510 are virtually separated from each other in storage of the storage section 522 of the battery control unit 520. FIG. 4 is flowchart illustrating a process flow when the charge-discharge unit 400 and the load 500 are connected to each other in the electric power system 1.

It is to be noted that the electric power system 1 is preferably operated in accordance with the following operation rules.

When the battery 510 is connected to an electric power grid to charge the dedicated region 511, the dedicated region 511 of the battery 510 is charged.

When the battery 510 is connected to the electric power grid, and the dedicated region 511 of the battery 510 is not charged (in other words, when the dedicated region 511 is fully charged, or when the user selects the dedicated region 511 not to be charged), the common region 512 of the battery 510 is allowed to be charged or discharged.

When the battery 510 is not connected to the electric power grid, and electric power remains in the dedicated region 511 of the battery 510, the user is allowed to use only the electric power of the dedicated region 511 of the battery 510.

When the battery 510 is not connected to the electric power grid, and electric power does not remain in the dedicated region 511 of the battery 510, the user is allowed to use electric power of the common region 512 of the battery 510.

First, in step S101, the charge-discharge unit 400 and the load 500 are connected to each other. Connection between the charge-discharge unit 400 and the load 500 is established through connecting, for example, the connector 444 of the charge-discharge unit 400 to an outlet of the load 500. Next, in step S102, the process proceeds to step S103 when electric power is sufficiently supplied to the electric power grid based on a result of confirmation of an electric power supply and demand situation in the electric power grid by the electric power control unit 200 (Yes in step S102).

Next, in step S103, whether the dedicated region 511 of the battery 510 is to be charged is confirmed based on, for example, an input supplied to the input section 524 of the battery control unit 520 by the user to select charge or discharge. When the dedicated region 511 of the battery 510 is to be charged, the process proceeds to step S104 (yes in step S103).

Next, in step S104, the control section 523 of the battery control unit 520 confirms whether the dedicated region 511 of the battery 510 is fully charged. The control section 523 performs such confirmation by making reference to the remaining amount data stored in the storage section 524, or the like. When the dedicated region 511 of the battery 510 is not fully charged, the process proceeds to step S105 (No in step S104). Then, in step S105, the battery 510 is charged.

Next, in step S106, the control section 523 of the battery control unit 520 updates the remaining amount data of the dedicated region 511 in the storage section 522 so as to add an electric power amount supplied to the battery 510 to the remaining amount of the dedicated region 511 in the remaining amount data. Moreover, the control section 523 also updates an indication of the remaining amount of the dedicated region 511 of the battery 510 on the display section 525.

The process proceeds to step S104 again, and the control section 523 of the battery control unit 520 confirms whether the dedicated region 511 of the battery 510 is fully charged. Then, unless the dedicated region 511 of the battery 510 is fully charged, the process from step S104 to step S106 is repeated, and the battery 510 is charged until the dedicated region 511 is fully charged.

In step S104, when it is confirmed that the dedicated region 511 of the battery 510 is fully charged, the process proceeds to step S107 (Yes in step S104). Next, in step S107, the control section 523 of the battery control unit 520 confirms whether the common region 512 of the battery 510 is fully charged. The control section 523 performs such confirmation by making reference to the remaining amount data stored in the storage section 524. When the common region 512 of the battery 510 is not fully charged, the process proceeds to step S108 (No in step S107). Then, in step S108, the battery 510 is charged.

Next, in step S109, the control section 523 of the battery control unit 520 updates the remaining amount data of the common region 512 in the storage section 522 so as to add an electric power amount supplied to the battery 510 to the remaining amount of the common region 512. Moreover, the control section 523 also updates an indication of the remaining amount of the common region 512 of the battery 510 on the display section 525.

Then, the process proceeds to step S107 again, and the control section 523 of the battery control unit 520 confirms whether the common region 512 of the battery 510 is fully charged. Then, unless the common region 512 of the battery 510 is fully charged, the process from step S107 to step S109 is repeated, and the battery 510 is charged until the common region 512 is fully charged.

Then, in step S107, when it is determined that the common region 512 of the battery 510 is fully charged, the process proceeds to step S110 (Yes in step S107).

Next, in step S110, the billing-authentication server 600 performs a billing process to the user. The billing process may be performed by, for example, identifying the user of the load 500 through obtaining identification information or the like with use of the authentication outlet, and withdrawing a payment by a credit card or a bank account of the user. As described above, the billing process may differ between charging of the dedicated region 511 and charging of the common region 512. For example, a price for charging of the common region 512 may be lower than that for charging of the dedicated region 511. Alternatively, the dedicated region 511 may be charged at cost, and the common region 512 may be charged for free.

When the billing process is completed, the connection between the charge-discharge unit 400 and the load 500 is disconnected in step S111. Thus, the process is completed.

Figure 6:
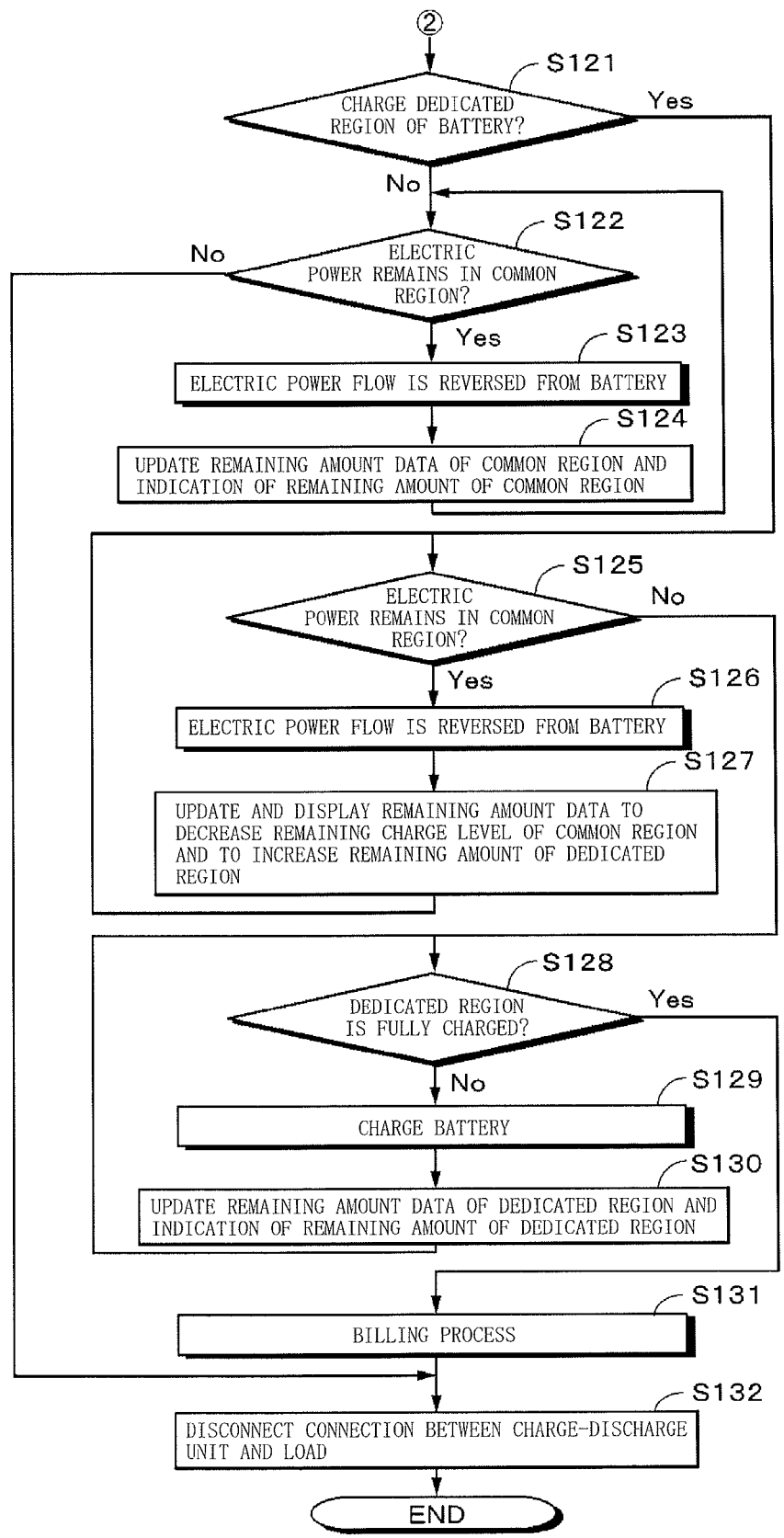
FIG. 6 is a flowchart illustrating a process flow when the charge-discharge unit and the load are connected to each other in the first embodiment of the present disclosure.

Next, a process when electric power is not sufficiently supplied to the electric power grid in the above-described step S102 (No in step S102) will be described based on a flowchart in FIG. 6.

First, in step S121, whether the dedicated region 511 of the battery 510 is to be charged is confirmed based on, for example, an input supplied to the input section 524 of the battery control unit 520 by the user to select charge or discharge. When the dedicated region 511 of the battery 510 is not to be charged, the process proceeds to step S122 (No in step S121).

Next, in step S122, the control section 523 of the battery control unit 520 confirms whether electric power remains in the common region 512 of the battery 510. When electric power remains in the common region 512 of the battery 510, the process proceeds to step S123 (Yes in step S122).

Next, in step S123, an electric power flow is reversed from the battery 510 to the electric power grid through the charge-discharge unit 400 under control by the electric power control unit 200. Then, in step S124, the control section 523 of the battery control unit 520 updates the remaining amount data of the common region 512 in the storage section 522 so as to decrease the remaining amount of the common region 512 in the remaining amount data by an electric power amount discharged by the reversed electric power flow. Moreover, the indication of the remaining amount of the common region 512 on the display section 525 is also updated so as to decrease the indication of the remaining amount of the common region 512 by the electric power amount discharged by the reversed electric power flow.

On the other hand, in step S122, when it is confirmed that electric power does not remain in the common region 512 of the battery 510, the process proceeds to step S132 (No in step S122). Then, the connection between the charge-discharge unit 400 and the load 500 is disconnected, and the process is completed.

Referring back to step S121, when the dedicated region 511 of the battery 510 is to be charged in step S121, the process proceeds to step S125 (Yes in step S121). Next, in step S125, the control section 523 of the battery control unit 520 confirms whether electric power remains in the common region 512 of the battery 510. When electric power remains in the common region 512, the process proceeds to step S126 (Yes in step S125).

Next, in step S126, an electric power flow is reversed from the battery 510 to the electric power grid through the charge-discharge unit 400. Then, in step S127, the control section 523 of the battery control unit 520 updates the remaining amount data in the storage section 522 so as to decrease the remaining amount of the common region 512 and to increase the remaining amount of the dedicated region 511 in the remaining amount data. Moreover, the indications of the remaining amounts of the common region 512 and the dedicated region 511 on the display section 525 are also updated so as to decrease the indication of the remaining amount of the common region 512 and to increase the indication of the remaining amount of the dedicated region 511. It is to be noted that, among an amount of reversed electric power flow, a decrease in the remaining amount of the common region 512, and an increase in the remaining amount of the dedicated region 511, a relationship "decrease in common region=increase in dedicated region+amount of reversed electric power flow" is established. The remaining amount of the entire battery (the common region+the dedicated region) is decreased by the reversed electric power flow; however, when the remaining amount of the dedicated region 511 is increased, the user is allowed to secure some electric power specifically for use by the user. Thus, for example, in the case where any one of the embodiments of the present disclosure is applied to an electric vehicle, a situation in which, when the user is about to drive the electric vehicle back to his home, the electric vehicle does not move due to no electric power remaining in the battery is preventable.

Then, the process proceeds to step S125 again, and the control section 523 of the battery control unit 520 confirms the remaining amount of the common region 512 of the battery 510. Then, the process from step S125 to step S127 is repeated until the remaining amount of the common region 512 of the battery 510 becomes empty, and an electric power flow is reversed from the battery 510.

On the other hand, in step S125, when it is confirmed that electric power does not remain in the common region 512, the process proceeds to step S128 (No in step S125). Next, in step S128, the control section 523 of the battery control unit 520 confirms whether the dedicated region 511 of the battery 510 is fully charged. The control section 523 is allowed to perform such confirmation by making reference to the remaining amount data in the storage section 522 of the battery control unit 520.

When the dedicated region 511 of the battery 510 is not fully charged, the process proceeds to step S129 (No in step S128). Next, in step S129, the battery 510 is charged by the charge-discharge unit 400. Then, in step S130, the control section 523 of the battery control unit 520 updates the remaining amount data of the dedicated region 511 in the storage section 522 so as to add an electric power amount supplied to the battery 510 to the remaining amount of the dedicated region 511 in the remaining amount data. Moreover, the control section 523 also updates the indication of the remaining amount of the dedicated region 511 of the battery 510 on the display section 525.

The process proceeds to step S128 again, and the control section 523 of the battery control unit 520 confirms the remaining amount of the battery 510, thereby confirming whether the dedicated region 511 of the battery 510 is fully charged. Then, unless the dedicated region 511 of the battery 510 is fully charged, the process from step S128 to step S130 is repeated, and the battery 510 is charged until the dedicated region 511 is fully charged.

In step S128, when the control section 523 of the battery control unit 520 confirms that the dedicated region 511 of the battery 510 is fully charged, the process proceeds to step S131 (Yes in step S128).

Next, in step S131, the billing-authentication server 600 performs a billing process to the user. As described above, the billing process may differ between charging of the dedicated region 511 and charging of the common region 512. For example, a price for charging of the common region 512 may be lower than that for charging of the dedicated region 511. Alternatively, the dedicated region 511 may be charged at cost, and the common region 512 may be charged for free.

When the billing process is completed, the connection between the charge-discharge unit 400 and the load 500 is disconnected in step S132. Thus, the process is completed.

Figure 7:
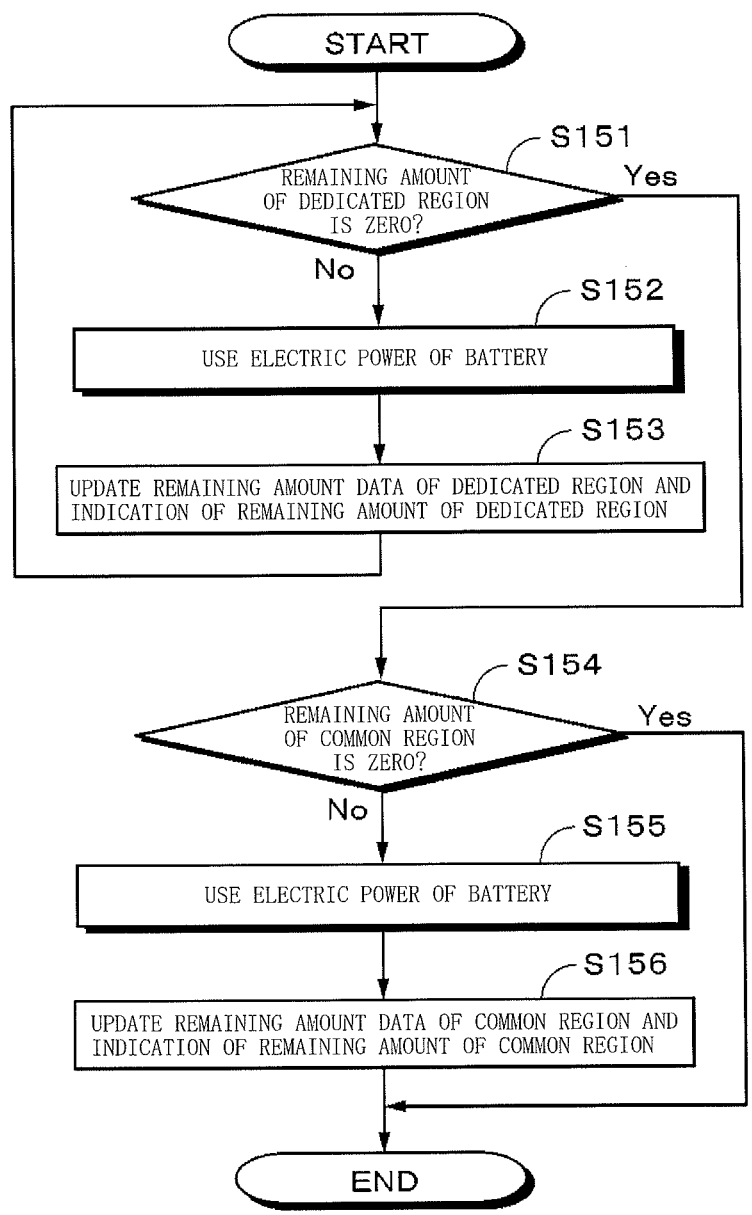
FIG. 7 is a flowchart illustrating a process flow when the charge-discharge unit and the load are not connected to each other in the first embodiment of the present disclosure.

Next, a process when the charge-discharge unit 400 and the load 500 are not connected to each other will be described referring to a flowchart in FIG. 7.

First, in step S151, the control section 523 of the battery control unit 520 confirms whether the remaining amount of the dedicated region 511 of the battery 510 is zero. Then, when the remaining amount of the dedicated region 511 of the battery 510 is not zero, that is, when electric power remains in the dedicated region 511, the process proceeds to step S152 (No in step S151).

When the remaining amount of the dedicated region 511 of the battery 510 is not zero, in step S152, the user uses electric power remaining in the dedicated region 511 of the battery 510. Then, in step S153, the control section 523 of the battery control unit 520 updates the remaining amount data of the dedicated region 511 in the storage section 522 so as to decrease the remaining amount of the dedicated region 511 in the remaining amount data in the storage section 522 in accordance with the use of the electric power of the dedicated region 511. Moreover, the control section 523 also updates the indication of the remaining amount of the dedicated region 511 on the display section 525 so as to decrease the indication of the remaining amount of the dedicated region 511.

The process proceeds to step S151, and the process from step S151 to step S153 is repeated until the remaining amount of the dedicated region 511 comes to zero, and electric power of the dedicated region 511 is used by the user. Then, when the remaining amount of the dedicated region 511 of the battery 510 comes to zero, the process proceeds from step S151 to step S154 (Yes in step S151).

Next, in step S154, the control section 523 of the battery control unit 520 confirms whether the remaining amount of the common region 512 of the battery 510 is zero. Then, when the remaining amount of the common region 512 of the battery 510 is not zero, that is, when electric power remains in the common region 512, the process proceeds to step S155 (No in step S154).

When the remaining amount of the common region 512 of the battery 510 is not zero, in step S155, the user uses electric power remaining in the common region 512 of the battery 510. Then, in step S156, the control section 523 decreases the remaining amount of the common region 512 in the remaining amount data in the storage section 522 in accordance with the use of electric power of the common region 512. Moreover, the control section 523 also decreases the indication of the remaining amount of the common region 512 displayed on the display section 525.

The process proceeds to step S154, and the process from step S154 to step S156 is repeated until the remaining amount of the common region 512 comes to zero, and electric power of the common region 512 is used by the user. Then, when the remaining amount of the common region 512 of the battery 510 comes to zero, the process is completed (Yes in step S154).

Thus, when the user uses electric power stored in the battery, it is preferable that the user be allowed to use electric power of the dedicated region 511 of the battery 510 first, and then to use electric power of the common region 512 after the dedicated region 511 runs out of electric power, because, in the case where there is a difference in price between charging of the dedicated region 511 and charging of the common region 512, if the electric power of the common region 512 is allowed to be used first, it becomes possible to continuously use only the electric power of the common region 512 which is lower in price.

2. Second Embodiment

2-1. Configuration of Electric Power System

Next, a second embodiment of the present disclosure will be described below. A configuration of an electric power system and a configuration of the charge-discharge unit 400 in the second embodiment are similar to those in the first embodiment, and will not be further described.

Figure 8:
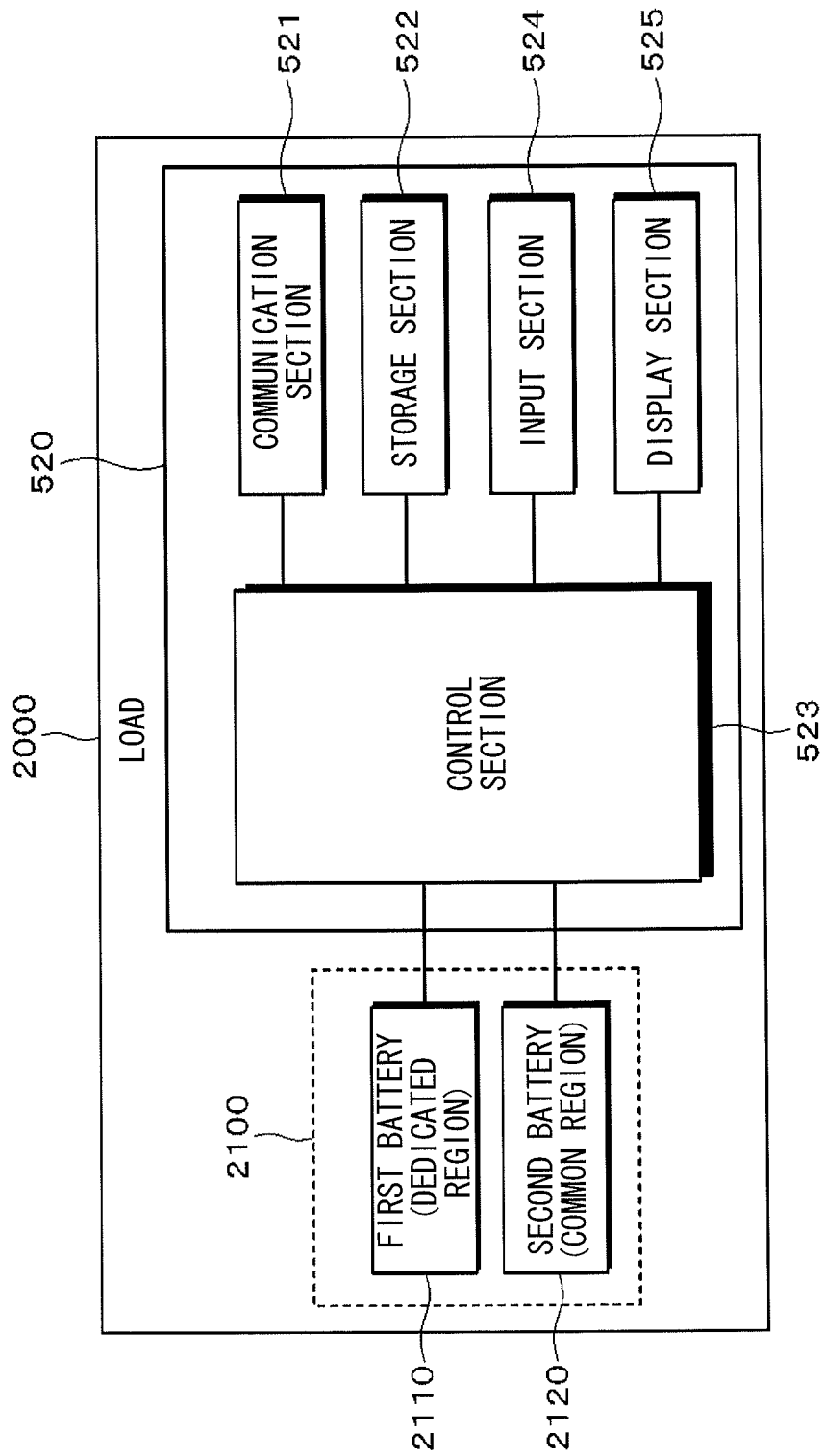
FIG. 8 is a block diagram illustrating a configuration of a load according to a second embodiment of the present disclosure.

FIG. 8 is a block diagram illustrating a configuration of a load 2000 according to the second embodiment. The load 2000 includes a battery 2100 and a battery control unit 520. The second embodiment is different from the first embodiment in that a dedicated region and a common region of the battery 2100 are physically separated from each other.

The battery 2100 in the second embodiment is configured of a first battery 2110 as the dedicated region and a second battery 2120 as the common region. As the first battery 2110 and the second battery 2120, any of chargeable-dischargeable batteries such as a lithium-ion secondary battery, a lithium-ion polymer secondary battery, and a nickel-hydrogen battery may be adopted.

Each of the first battery 2110 and the second battery 2120 is connected to the charge-discharge unit 400, and the first battery 2110 and the second battery 2120 are allowed to be independently charged from and discharged to the charge-discharge unit 400.

2-2. Process in Electric Power System

Figure 9:
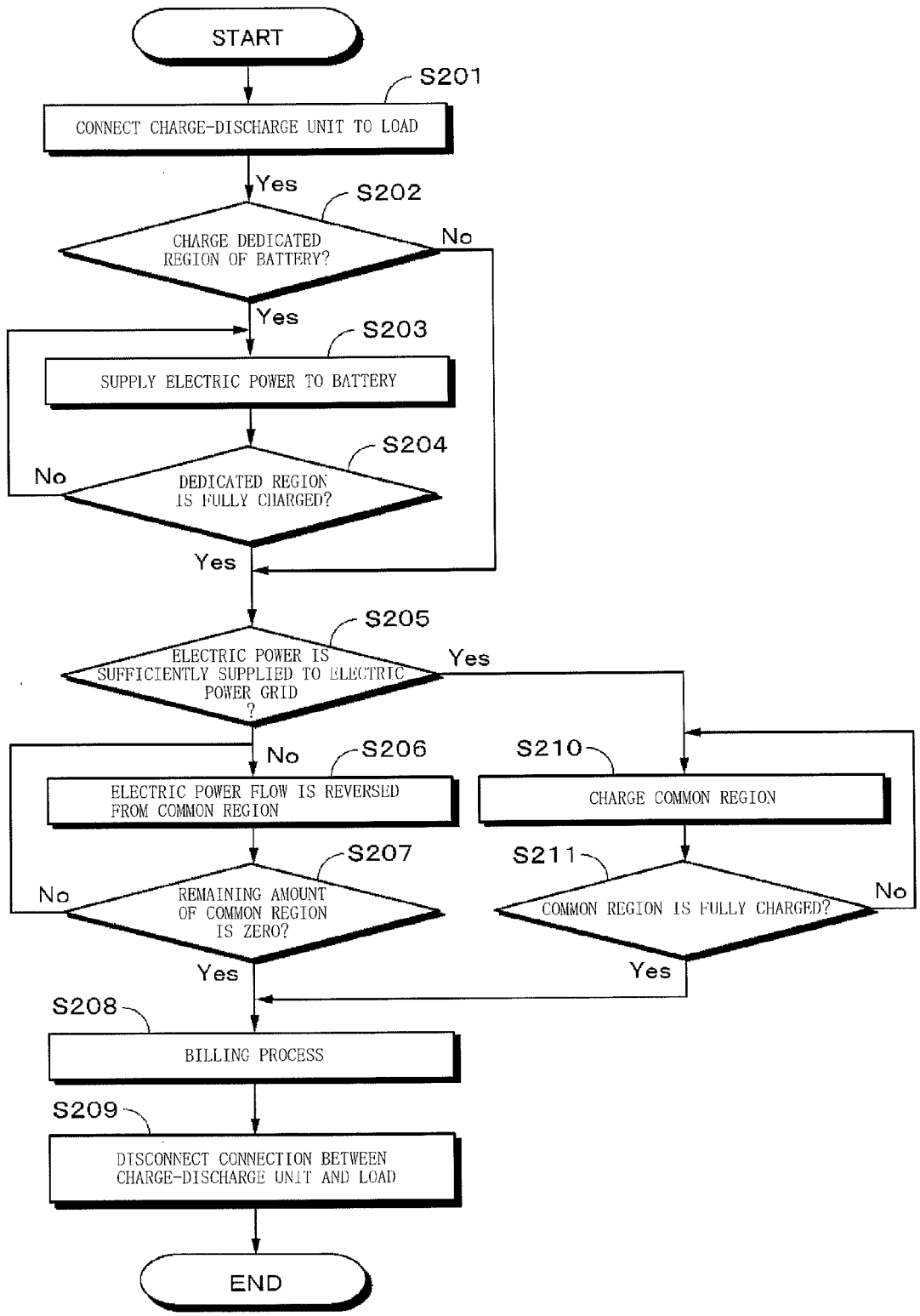
FIG. 9 is a flowchart illustrating a process flow when the charge-discharge unit and the load are connected to each other in the second embodiment of the present disclosure.
Figure 10:
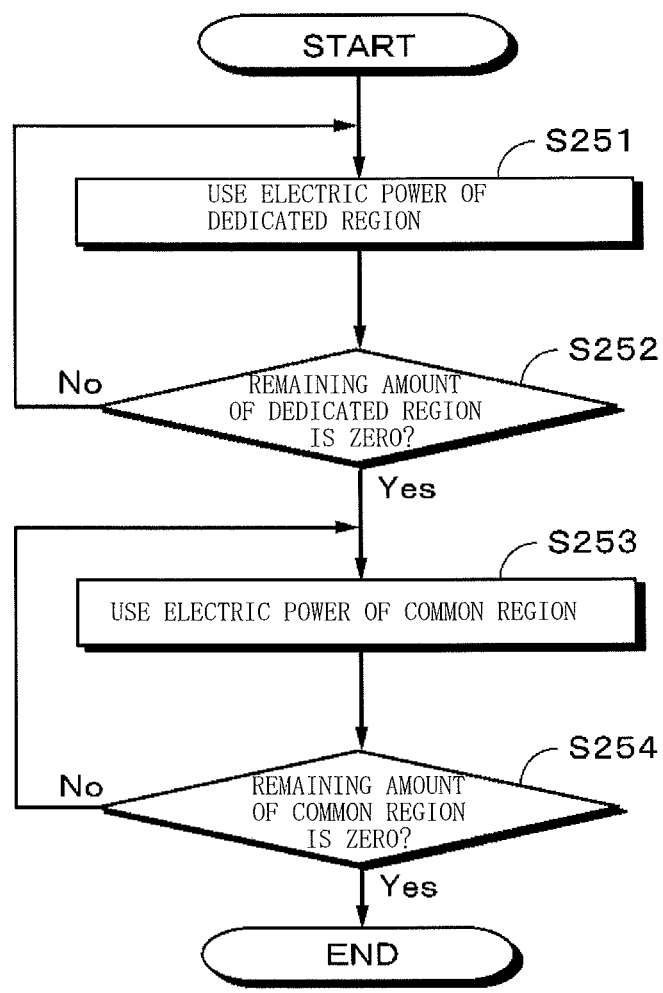
FIG. 10 is a flowchart illustrating a process flow when the charge-discharge unit and the load are not connected to each other in the second embodiment of the present disclosure.

Next, a process in the second embodiment will be described referring to a flowchart in FIG. 9. First, in step S201, a charge cable of the charge-discharge unit 400 and an outlet of the load 2000 are connected to each other. Next, in step S202, whether the first battery 2110 as the dedicated region is to be charged is confirmed, based on, for example, detail of an instruction for charge provided to the charge-discharge unit 400 by the user. When the first battery 2110 as the dedicated region is to be charged, the process proceeds to step S203 (Yes in step S202).

Then, in step S203, the charge-discharge unit 400 charges the first battery 2110. Next, in step S204, the control section 523 of the battery control unit 520 confirms whether the first battery 2110 as the dedicated region is fully charged. When the first battery 2110 is not fully charged, step S203 and step S204 are repeated, and the first battery 2110 is charged until the first battery 2110 is fully charged (No in step S204).

When the first battery 2110 as the dedicated region is fully charged, the process proceeds to step S205 (Yes in step S204). Next, in step S205, when electric power is not sufficiently supplied to the electric power grid based on a result of confirmation of an electric power supply and demand situation in the electric power grid by the electric power control unit 200, that is, when the electric power grid is short of electric power, the process proceeds to step S206 (No in step S205).

In step S206, an electric power flow is reversed from the second battery 2120 as the common region to the electric power grid through the charge-discharge unit 400. When the electric power control unit 200 confirms that the electric power grid is short of electric power, and the electric power control unit 200 switches the operation of the charge-discharge unit 400 from a charging mode to a discharging mode, the electric power flow is reversed in such a manner. Then, in step S207, the control section 523 of the battery control unit 520 confirms whether the remaining amount of the second battery 2120 as the common region is zero. Unless the remaining amount of the second battery 2120 is zero, step S206 and step S207 are repeated, and an electric power flow is reversed from the second battery 2120 as the common region.

When the remaining amount of the second battery 2120 as the common region comes to zero, the process proceeds to step S208 (Yes in step S207). Next, in step S208, the billing-authentication server 600 performs a billing process to the user. The billing process may be performed by, for example, identifying the user of the load 2000 through obtaining identification information or the like with use of the authentication outlet, and withdrawing a payment by a credit card or a bank account of the user. As described above, the billing process may differ between charging of the dedicated region and charging of the common region. For example, a price for charging of the common region may be lower than that for charging of the dedicated region. Alternatively, the dedicated region may be charged at cost, and the common region may be charged for free.

When the billing process is completed, the connection between the charge-discharge unit 400 and the load 2000 are disconnected in step S209, and the process is completed.

Referring back to step S205, when the electric power control unit 200 confirms that electric power is sufficiently supplied to the electric power grid, the process proceeds to step S210 (Yes in step S205). Next, in step S210, the charge-discharge unit 400 charges the second battery 2120 as the common region. Then, in step S211, the control section 523 of the battery control unit 520 confirms whether the second battery 2120 as the common region is fully charged, and step S210 and step S211 are repeated and the second battery 2120 is charged until the second battery 2120 is fully charged.

In step S211, when it is confirmed that the second battery 2120 as the common region is fully charged, the process proceeds to step S208 (Yes in step S211). Next, in step S208, the billing-authentication server 600 performs the billing process to the user. When the billing process is completed, the connection between the charge-discharge unit 400 and the load 2000 is disconnected in step S209, and the process is completed.

Next, referring to a flowchart in FIG. 7, a process when the charge-discharge unit 400 and the load 2000 are not connected to each other in the second embodiment will be described below.

First, in step S251, electric power of the first battery 2110 as the dedicated region is used. In this case, using the load 2000 by the user means using the electric power of the first battery 2110 as the dedicated region. Then, in step S252, the electric power of the first battery 2110 is used in steps S251 and S252 in accordance with the use of the load 2000 by the user until the control section 523 of the battery control unit 520 confirms that the remaining amount of the first battery 2110 as the dedicated region comes to zero.

Then, when the remaining amount of the first battery 2110 as the dedicated region comes to zero, the process proceeds to step S253 (Yes in step S252), and the electric power of the second battery 2120 as the common region is used. Since the remaining amount of the first battery 2110 as the dedicated region has been already zero, using the load 2000 by the user means using the electric power of the second battery 2120 as the common region.

Then, in step S254, the electric power of the second battery 2120 is used in steps S253 and S254 in accordance with the use of the load 2000 by the user until the control section 523 of the battery control unit 520 confirms that the remaining amount of the second battery 2120 as the common region comes to zero.

Thus, when the user uses electric power stored in the battery 2100, it is preferable that the user be allowed to use electric power of the dedicated region first, and then to use electric power of the common region after the dedicated region runs out of electric power, because, in the case where there is a difference in price between charging of the dedicated region and charging of the common region, if the electric power of the common region is allowed to be used first, it becomes possible to continuously use only the electric power of the common region which is lower in price.

The process according to the second embodiment is performed in the above-described manner.

Thus, in the above-described embodiments of the present disclosure, a user possessing a load is allowed to provide electric power of a common region as a part of his battery to an electric power provider or a third party such as the public. Therefore, even if the electric power provider does not invest in facilities, an environment synonymous with an environment in which batteries are present in many places in an electric power grid is created, and stabilization of electric power supply and demand is achievable through charging and discharging the batteries.

Moreover, the user is allowed to use electric power stored in the common region by a third party, as necessary. At this time, for example, when the dedicated region is allowed to be charged at cost and the common region is allowed to be charged for free, the user is allowed to use electricity at low cost. Thus, a range of use of electric power is allowed to be expanded.

In the first embodiment, since the battery is virtually separated into the dedicated region and the common region on the basis of the remaining amount data, the first embodiment is easily introduced. However, as with the second embodiment, the technology of the present disclosure is achievable through physically separating the battery into the dedicated region and the common region.

The load including the battery may be any unit or any apparatus operating by electric power. However, since electric power is supplied to the electric power grid by the reversed electric power flow, the load preferably includes a large-capacity battery. Examples of the load including a large-capacity battery include an electric vehicle and a hybrid vehicle (hereinafter collectively referred to as "electric vehicle"). A configuration of the electric vehicle to which any of the embodiments of the present disclosure is applied will be described below.

Figure 11:
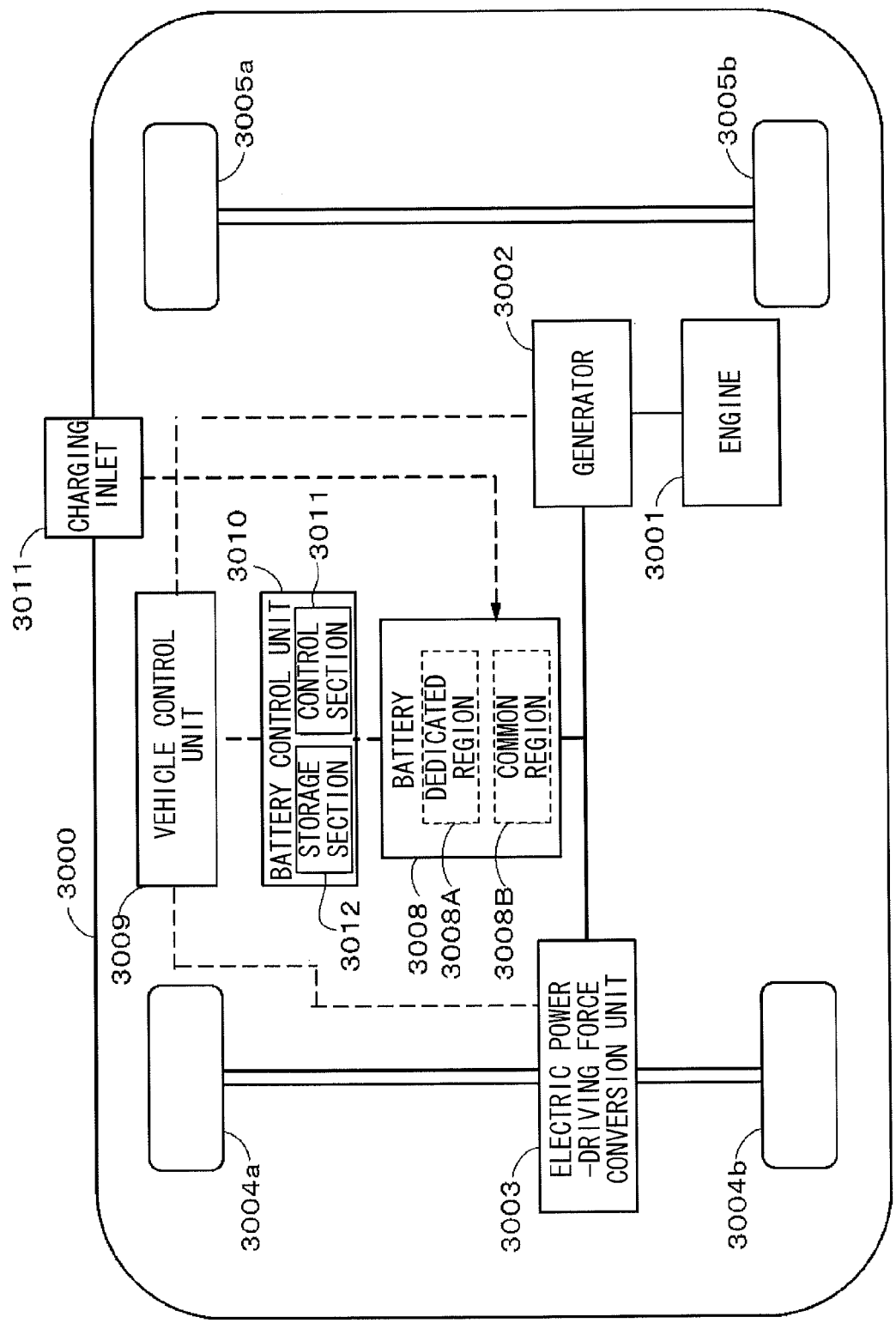
FIG. 11 is a block diagram illustrating a configuration of a first example of an electric vehicle.
Figure 12:
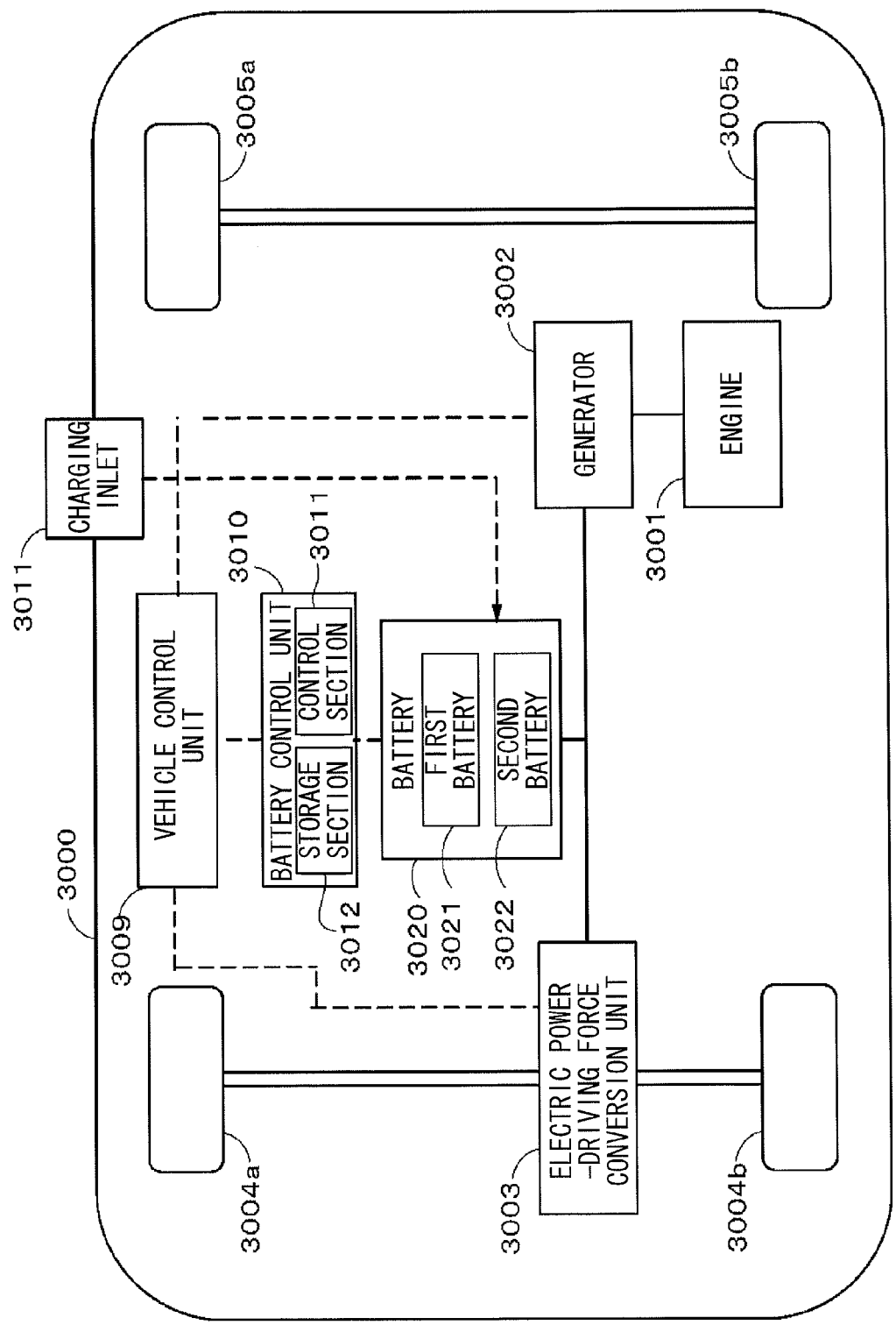
FIG. 12 is a block diagram illustrating a configuration of a second example of the electric vehicle.

FIGS. 11 and 12 schematically illustrate examples of the configuration of the electric vehicle to which any of the embodiments of the present disclosure is applied. The electric vehicle is a vehicle running by an electric power-to-driving force conversion unit with use of electric power stored in a battery. FIG. 11 illustrates an electric vehicle in which the battery is virtually separated into a dedicated region and a common region as with the first embodiment. FIG. 12 illustrates an electric vehicle in which the battery is physically separated into a dedicated region and a common region as with the second embodiment.

An electric vehicle 3000 includes an engine 3001, a generator 3002, an electric power-to-driving force conversion unit 3003, a driving wheel 3004a, a driving wheel 3004b, a wheel 3005a, a wheel 3005b, a battery 3008, a vehicle control unit 3009, a battery control unit 3010, and a charging inlet 3011. The battery includes a dedicated region and a common region. As illustrated in FIG. 11, as with the first embodiment, the battery may be virtually separated into the dedicated region and the common region. Moreover, as illustrated in FIG. 12, as with the second embodiment, the battery may be physically separated into a first battery 3021 as a dedicated region and a second battery 3022 as a common region. As illustrated in FIG. 11, a battery control unit 3010 including a control section 3011, a storage section 3012, and the like may be provided in addition to the vehicle control unit 3009, or the vehicle control unit 3009 may have a function of a battery control unit. It is to be noted that the configuration, functions, and the like of the battery control unit 3010 are similar to those in the first or second embodiment.

The electric vehicle 3000 runs with use of the electric power-to-driving force conversion unit 3003 as a power source. An example of the electric power-to-driving force conversion unit 3003 is a motor. The electric power-to-driving force conversion unit 3003 is activated with use of electric power of a battery module 208, and torque of the electric power-to-driving force conversion unit 3003 is transmitted to the driving wheels 3004a and 3004b. It is to be noted that either an AC motor or a DC motor is applicable as the electric power-to-driving force conversion unit 3003 through using direct current-to-alternating current (DC-to-AC) conversion or reverse conversion (AC-to-DC conversion) at a necessary point.

The torque of the engine 3001 is transmitted to the generator 3002, and electric power generated by the generator 3002 with use of the torque is allowed to be stored in the battery module 208.

When the electric vehicle 3000 is decelerated by a braking mechanism (not illustrated), resistance generated during deceleration is applied to the electric power-to-driving force conversion unit 3003 as torque, and the regenerative electric power generated by the torque in the electric power-to-driving force conversion unit 3003 is stored in the battery module 208.

When the battery 3008 is connected to, for example, a charge-discharge unit such as a plug-in station, the battery 3008 is allowed to receive electric power from the charge-discharge unit through the charging inlet 3011 as an inlet, and to hold the received electric power accordingly. Moreover, as described in the first embodiment and the second embodiment, an electric power flow may be reversed from the battery to an electric power grid through the charge-discharge unit.

Although not illustrated, an information processing unit which performs information processing relating to vehicle control based on information relating to the battery may be included. Examples of such an information processing unit include an information processing unit which displays the remaining amount of the battery based on information relating to the remaining amount of the battery.

It is to be noted that a series hybrid vehicle which runs on a motor with use of electric power generated by a generator actuated by an engine or electric power temporarily stored in the battery is described as an example. However, the embodiments of the present disclosure are effectively applicable to a parallel hybrid vehicle which takes both engine output and motor output as driving sources, and appropriately switches between three modes, i.e., a mode in which the vehicle runs on an engine alone, a mode in which the vehicle runs on a motor alone, and a mode in which the vehicle runs on both the engine and the motor. Further, the embodiments of the present disclosure are effectively applicable to a so-called electric vehicle which runs on a driving motor alone without using an engine.

3. Modifications

Although some embodiments of the present disclosure are specifically described above, the present disclosure is not limited thereto, and may be variously modified based on technical ideas of the present disclosure. The technology of the present disclosure may have the following configurations.

(1) A battery control unit including:
a storage section holding remaining amount data that indicates a remaining amount of a battery; and
a control section managing the battery in a fashion of separating the battery into a first region and a second region, by a way of separating the remaining amount data into first remaining amount data and second remaining data and of allowing the storage section to hold the first and second remaining amount data.

(2) The battery control unit according to (1), in which the first region is available to a predetermined user only.

(3) The battery control unit according to (1) or (2), in which the second region is available to a predetermined user, and is configured to supply electric power to an electric power grid.

(4) The battery control unit according to any one of (1) to (3), in which the control section increases a value of the first remaining amount data in the storage section when the first region of the battery is charged, and increases a value of the second remaining amount data in the storage section when the second region of the battery is charged.

(5) The battery control unit according to any one of (1) to (4), in which the control section decreases a value of the first remaining amount data in the storage section when the first region of the battery is discharged, and decreases a value of the second remaining amount data in the storage section when the second region of the battery is discharged.

(6) The battery control unit according to any one of (1) to (5), in which the control section decreases a value of the second remaining amount data upon a condition where a value of the first remaining amount data comes to zero.

(7) A charge-discharge unit including a control section operable to:
supply electric power from an electric power grid to a battery when electric power supply is sufficient for electric power demand in the electric power grid; and
supply electric power reversed from the battery to the electric power grid when the electric power supply is insufficient for the electric power demand in the electric power grid.

(8) An electric power control unit including a control section operable to:
perform monitoring as to whether or not electric power supply is sufficient for electric power demand in an electric power grid; and
selectively provide a charge-discharge unit with a first instruction or a second instruction, depending on a result of the monitoring, the first instruction instructing the charge-discharge unit to supply electric power from the electric power grid to the battery when the electric power supply is sufficient for the electric power demand in the electric power grid, the second instruction instructing the charge-discharge unit to supply electric power reversed from the battery to the electric power grid when the electric power supply is insufficient for the electric power demand in the electric power grid.

(9) A battery unit including:
a first battery available to a predetermined user only; and
a second battery available to the user, and configured to supply electric power to an electric power grid.

(10) An electric vehicle provided with a battery control unit, the battery control unit including:
a battery;
a storage section holding remaining amount data that indicates a remaining amount of the battery; and
a control section managing the battery in a fashion of separating the battery into a first region and a second region, by a way of separating the remaining amount data into first remaining amount data and second remaining data and of allowing the storage section to hold the first and second remaining amount data.

(11) An electric vehicle including:
a first battery available to a predetermined user only; and
a second battery available to the user, and configured to supply electric power to an electric power grid.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery control unit comprising:
a storage section holding remaining amount data that indicates a remaining amount of a battery; and
a control section managing the battery in a fashion of separating the battery into a first region and a second region, by a way of separating the remaining amount data into first remaining amount data and second remaining data and of allowing the storage section to hold the first and second remaining amount data,
wherein a ratio in capacity between the first region and the second region in the battery is variable.

2. The battery control unit according to claim 1, wherein the first region is available to a predetermined user only.

3. The battery control unit according to claim 1, wherein the second region is configured to supply electric power to an electric power grid.

4. The battery control unit according to claim 3, wherein the second region is configured to supply electric power to a predetermined user.

5. The battery control unit according to claim 3, wherein the second region is configured to supply electric power to the electric power grid after the first region is fully charged when a charge-discharge unit is connected with the battery.

6. The battery control unit according to claim 1, wherein the control section increases a value of the first remaining amount data in the storage section when the first region of the battery is charged, and increases a value of the second remaining amount data in the storage section when the second region of the battery is charged.

7. The battery control unit according to claim 1, wherein the control section decreases a value of the first remaining amount data in the storage section when the first region of the battery is discharged, and decreases a value of the second remaining amount data in the storage section when the second region of the battery is discharged.

8. The battery control unit according to claim 1, wherein the control section decreases a value of the second remaining amount data upon a condition where a value of the first remaining amount data comes to zero.

9. The battery control unit according to claim 1, wherein the battery is configured to be virtually separated into the first region and the second region.

10. The battery control unit according to claim 1, wherein the first region is larger in capacity than the second region.

11. The battery control unit according to claim 1, wherein the second region supplies electric power after the first remaining amount data associated with the first region comes to zero when a charge-discharge unit is disconnected with the battery.

12. An electric vehicle provided with a battery control unit, the battery control unit comprising:
   a battery;
   a storage section holding remaining amount data that indicates a remaining amount of the battery; and
   a control section managing the battery in a fashion of separating the battery into a first region and a second region, by a way of separating the remaining amount data into first remaining amount data and second remaining data and of allowing the storage section to hold the first and second remaining amount data
   wherein a ratio in capacity between the first region and the second region in the battery is variable.

13. The electric vehicle according to claim 12, wherein the first region is available to a predetermined user only.

14. The electric vehicle according to claim 12, wherein the second region is configured to supply electric power to an electric power grid.

15. The electric vehicle according to claim 12, wherein the battery is configured to be virtually separated into the first region and the second region.

16. The electric vehicle according to claim 12, wherein the first region is larger in capacity than the second region.

17. The electric vehicle according to claim 12, wherein the second region is configured to supply electric power to a predetermined user.

18. The electric vehicle according to claim 12, wherein the second region supplies electric power after the first remaining amount data associated with the first region comes to zero when a charge-discharge unit is disconnected with the battery.

* * * * *